United States Patent
Hatada

(10) Patent No.: US 8,790,837 B2
(45) Date of Patent: Jul. 29, 2014

(54) METHOD FOR SHUTTING DOWN INDIRECT INTERNAL REFORMING SOLID OXIDE FUEL CELL

(75) Inventor: Susumu Hatada, Kanagawa (JP)

(73) Assignee: JX Nippon Oil & Energy Corporation (JP)

(*) Notice: Subject to any disclaimer, the term of this patent is extended or adjusted under 35 U.S.C. 154(b) by 119 days.

(21) Appl. No.: 13/511,251

(22) PCT Filed: Nov. 22, 2010

(86) PCT No.: PCT/JP2010/070774
§ 371 (c)(1),
(2), (4) Date: Sep. 5, 2012

(87) PCT Pub. No.: WO2011/065320
PCT Pub. Date: Jun. 3, 2011

(65) Prior Publication Data
US 2013/0011759 A1    Jan. 10, 2013

(30) Foreign Application Priority Data
Nov. 24, 2009 (JP) ................... 2009-266132

(51) Int. Cl.
H01M 8/04 (2006.01)
H01M 8/12 (2006.01)

(52) U.S. Cl.
USPC ............................................. 429/429

(58) Field of Classification Search
USPC ............................................. 429/429
See application file for complete search history.

(56) References Cited

U.S. PATENT DOCUMENTS

| 2004/0131540 A1 | 7/2004 | Fujii et al. |
| 2011/0189566 A1* | 8/2011 | Hatada .......................... 429/425 |

FOREIGN PATENT DOCUMENTS

| CN | 1418387 A | 5/2003 |
| JP | 2004-319420 A | 11/2004 |
| JP | 2005-314180 A | 11/2005 |
| JP | 2006-294508 A | 10/2006 |
| JP | 2009-176660 A | 8/2009 |
| JP | 2009-238599 A | 10/2009 |
| JP | 2009295380 A | * 12/2009 |
| JP | 2010153098 A | * 7/2010 |
| JP | 2010-287424 A | 12/2010 |

OTHER PUBLICATIONS

IPDL Machine Translation of JP 2009-295380A 9 (Dec. 2009).*

(Continued)

*Primary Examiner* — Gregg Cantelmo
(74) *Attorney, Agent, or Firm* — Cantor Colburn LLP

(57) ABSTRACT

Provided is a method for shutting down an indirect internal reforming SOFC, in which reliable reforming, prevention of anode oxidative degradation, fuel saving and time saving are possible. Reforming catalyst layer temperature T is measured, and FkCALC is calculated; when FkCALC≥FkE, T is measured, and FkCALC and FkMinCALC are calculated; if FkMinCALC≥FkE, then the flow rate of the fuel supplied to the reformer is set to FkE and the method moves on to step D; if FkCALC≤FkMinCALC<FkE, then C6 to C9 are performed in order; C6) the temperature of the reforming catalyst layer is increased; C7) T is measured, and FkCALC and FkMinCALC are calculated; C8) if FkCALC<FkE, then the flow rate of the fuel supplied to the reformer is set to FkMinCALC and the method returns to C6; C9) if FkCALC≥FkE, then the flow rate of the fuel supplied to the reformer is set to FkE and the method moves on to D; D) the method waits for the anode temperature to fall below an oxidative degradation temperature. FkE and the like are defined in the specification.

3 Claims, 7 Drawing Sheets

(56) References Cited

OTHER PUBLICATIONS

IPDL Machine Translation of JP 2009-176660 (Aug. 2009).*
IPDL Machine Translation of JP 2010-152098A (Jul. 2010).*
International Search Report for International Application No. PCT/JP2010/070774, mailed Mar. 1, 2011, with English translation.
First Office Action for Chinese Patent Application No. 201080052710.9, issued Apr. 25, 2014, with English translation.

* cited by examiner

US 8,790,837 B2

METHOD FOR SHUTTING DOWN INDIRECT INTERNAL REFORMING SOLID OXIDE FUEL CELL

CROSS REFERENCE TO RELATED APPLICATIONS

This is a U.S. national stage of application No. PCT/JP2010/070774, filed on 22 Nov. 2010. Priority under 35 U.S.C. §119(a) and 35 U.S.C. §365(b) is claimed from Japanese Application No. 2009-266132, filed 24 Nov. 2011, the disclosure of which are also incorporated herein by reference.

TECHNICAL FIELD

The present invention relates to a method for shutting down an indirect internal reforming solid oxide fuel cell having a reformer in the vicinity of a fuel cell.

BACKGROUND ART

A solid oxide fuel cell (hereinafter sometimes referred to as SOFC) system usually includes a reformer for reforming a hydrocarbon-based fuel, such as kerosene and city gas, to generate a reformed gas as a hydrogen-containing gas, and an SOFC for electrochemically reacting the reformed gas and air for electric power generation.

The SOFC is usually operated at a high temperature of 550 to 1000° C.

Various reactions, such as steam reforming (SR), partial oxidation reforming (PDX), and autothermal reforming (ATR), are used for reforming, and heating to a temperature at which catalytic activity is exhibited is necessary for using a reforming catalyst.

Steam reforming is a very large endothermic reaction. Also, the reaction temperature of the steam reforming is 550 to 750° C., which is relatively high, and the steam reforming requires a high temperature heat source. Therefore, an indirect internal reforming SOFC is known in which a reformer (internal reformer) is installed near an SOFC, and the reformer is heated using radiant heat from the SOFC and the combustion heat of the anode off-gas (gas discharged from the anode) of the SOFC as heat sources (Patent Literature 1).

Also, Patent Literature 2 discloses a method for shutting down the operation of a fuel cell, in which the stack temperature is decreased, while the fuel electrode layer side is maintained in a reducing condition, by supplying water, and hydrogen or a hydrocarbon-based fuel to the fuel cell, while decreasing their flow rates, in stopping electric power generation.

PRIOR ART LITERATURES

Patent Literatures

Patent Literature 1: JP2004-319420A
Patent Literature 2: JP2006-294508A

SUMMARY OF INVENTION

Problems to be Solved by the Invention

It is considered that when the method described in Patent Literature 2 is used, the anode can be maintained in a reducing atmosphere during the shutdown of the fuel cell, and the oxidative degradation of the anode can be prevented.

But, in the method described in Patent Literature 2, reliable reforming is not ensured when the SOFC anode is maintained in a reducing condition, using a hydrogen-containing gas obtained by reforming a hydrocarbon-based fuel. In other words, an unreformed hydrocarbon-based fuel may be discharged from the reformer and flow into the anode.

Particularly, in a case where a heavy hydrocarbon, such as kerosene, is used, when the heavy hydrocarbon leaks from the reformer and flows into the SOFC, the performance of the SOFC may be degraded due to carbon deposition.

Further, it is also significant to shorten shutdown time and reduce the amount of a hydrocarbon-based fuel required for shutdown.

It is an object of the present invention to provide a method for shutting down an indirect internal reforming SOFC, in which it is possible to prevent the oxidative degradation of the anode by a reformed gas, while reliably reforming a hydrocarbon-based fuel, and it is possible to save the fuel and shorten the time.

Means for Solving the Problems

The present invention provides
a shutdown method for shutting down an indirect internal reforming solid
oxide fuel cell including
a reformer for reforming a hydrocarbon-based fuel to produce a reformed gas,
said reformer including a reforming catalyst layer,
a solid oxide fuel cell for generating electric power using the reformed gas,
a combustion region for combusting an anode off-gas discharged from the solid oxide fuel cell, and
an enclosure for housing the reformer, the solid oxide fuel cell, and the combustion region,
wherein
a flow rate of the hydrocarbon-based fuel supplied to the reformer in a state in which the following conditions i to iv are all satisfied is represented as FkE,
i) an anode temperature of the solid oxide fuel cell is steady,
ii) the anode temperature is less than an oxidative degradation temperature,
iii) in the reformer, the hydrocarbon-based fuel is reformed, and a reformed gas having a composition suitable to be supplied to an anode is produced, and
iv) an amount of the reformed gas produced is equal to or more than a requisite minimum flow rate FrMin for preventing oxidative degradation of the anode when the anode temperature of the solid oxide fuel cell is a temperature that is equal to or more than the oxidative degradation temperature,
a flow rate of the hydrocarbon-based fuel supplied to the reformer at a point of time of the start of the shutdown method is represented as Fk0,
a calculated value of a flow rate of the hydrocarbon-based fuel capable of being reformed at a measured temperature of the reforming catalyst layer by a reforming method is represented as FkCALC, a type of this reforming method being a type of a reforming method which is performed after the start of the shutdown method,
when the anode temperature falls below the oxidative degradation temperature, supply of the hydrocarbon-based fuel to the reformer is stopped to complete the shutdown method, and
while the anode temperature does not fall below the oxidative degradation temperature, the shutdown method includes the following steps:

A) measuring a reforming catalyst layer temperature T, calculating FkCALC using this measured temperature T, and comparing values of this FkCALC and FkE;

B) when FkCALC<FkE in step A, performing the following steps B1 to B4 in order:

B1) increasing a temperature of the reforming catalyst layer,

B2) measuring the reforming catalyst layer temperature T, calculating FkCALC using this measured temperature T, and comparing values of this FkCALC and FkE, B3) when FkCALC<FkE in step B2, returning to step B1, and B4) when FkCALC≥FkE in step B2, adjusting the flow rate of the hydrocarbon-based fuel supplied to the reformer from Fk0 to FkE and moving on to step D;

C) when FkCALC≥FkE in step A, performing the following steps C1 to C5 in order:

C1) measuring the reforming catalyst layer temperature T, calculating FkCALC and FkMinCALC using this measured temperature T, said FkMinCALC being a flow rate of the hydrocarbon-based fuel at which the reformed gas at the flow rate FrMin can be produced in the reformer, and comparing values of this FkMinCALC and FkE, C2) when FkMinCALC≥FkE in step C1, adjusting the flow rate of the hydrocarbon-based fuel supplied to the reformer to FkE and moving on to step D, C3) when FkMinCALC<FkE in step C1, comparing values of FkMinCALC and FkCALC which have been calculated in step C1, C4) when FkCALC>FkMinCALC in step C3, adjusting the flow rate of the hydrocarbon-based fuel supplied to the reformer to FkMinCALC and returning to step C1, and C5) when FkCALC<FkMinCALC in step C3, performing the following steps C6 to C9 in order:

C6) increasing the temperature of the reforming catalyst layer,

C7) measuring the reforming catalyst layer temperature T, calculating FkCALC and FkMinCALC using this measured temperature T, and comparing values of this FkCALC and FkE, C8) when FkCALC<FkE in step C7, adjusting the flow rate of the hydrocarbon-based fuel supplied to the reformer to FkMinCALC and returning to step C6, and C9) when FkCALC≥FkE in step C7, adjusting the flow rate of the hydrocarbon-based fuel supplied to the reformer to FkE and moving on to step D; and D) waiting for the anode temperature to fall below the oxidative degradation temperature.

The hydrocarbon-based fuel may include a hydrocarbon-based fuel having a carbon number of two or more.

In this case, it is preferred that a concentration of a compound(s) having a carbon number of two or more in the reformed gas be 50 ppb or less on a mass basis.

Advantages of the Invention

The present invention provides a method for shutting down an indirect internal reforming SOFC, in which it is possible to prevent the oxidative degradation of the anode by a reformed gas, while reliably reforming a hydrocarbon-based fuel, and it is possible to save the fuel and shorten the time.

EMBODIMENTS FOR CARRYING OUT THE INVENTION

Embodiments of the present invention will be described below, using drawings, but the present invention is not limited thereto.

A "steam/carbon ratio" or "S/C" refers to a ratio of the number of moles of water molecules to the number of moles of carbon atoms in a gas supplied to a reforming catalyst layer. An "oxygen/carbon ratio" or "$O_2/C$" refers to a ratio of the number of moles of oxygen molecules to the number of moles of carbon atoms in a gas supplied to the reforming catalyst layer.

[Indirect Internal Reforming SOFC]

Figure 1:
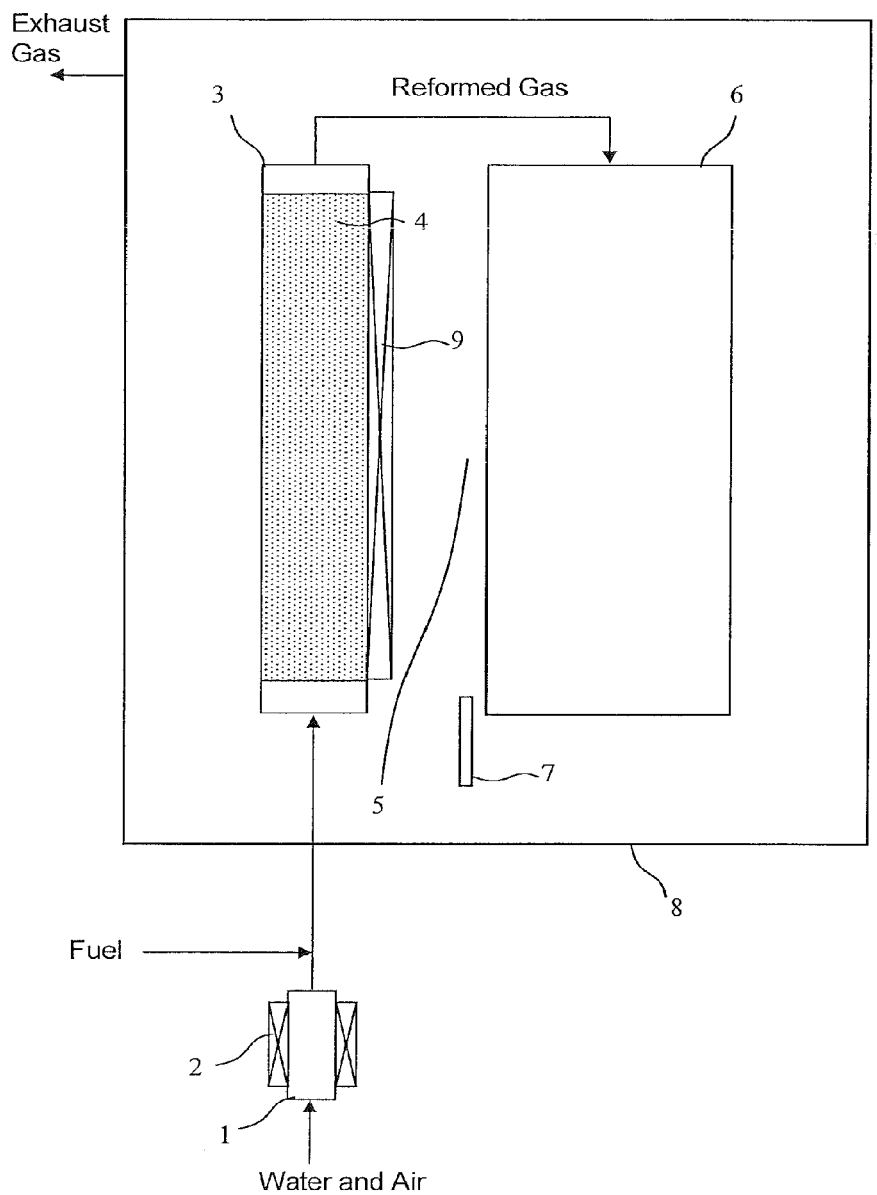
FIG. 1 is a schematic diagram showing an outline of an indirect internal reforming SOFC to which the present invention can be applied.

One embodiment of an indirect internal reforming SOFC in which the present invention can be carried out is schematically shown in FIG. 1.

The indirect internal reforming SOFC includes a reformer 3 for reforming a hydrocarbon-based fuel to produce a reformed gas (hydrogen-containing gas). The reformer includes a reforming catalyst layer 4.

The indirect internal reforming SOFC includes an SOFC 6 for generating electric power using the above reformed gas, and also includes a combustion region 5 for combusting an anode off-gas discharged from the SOFC (particularly the anode of the SOFC).

The indirect internal reforming SOFC includes an enclosure 8 for housing the reformer, the solid oxide fuel cell, and the combustion region.

The indirect internal reforming SOFC refers to the enclosure (module container) 8 and equipment included in the interior of the enclosure.

In the indirect internal reforming SOFC in the embodiment shown in FIG. 1, an igniter 7 that is an ignition means for igniting the anode off-gas is provided, and also, the reformer is equipped with an electrical heater 9.

Each supply gas is supplied to the reformer or the SOFC, after being appropriately preheated as required.

A water vaporizer 1 equipped with an electrical heater 2 is connected to the indirect internal reforming SOFC, and piping for supplying the hydrocarbon-based fuel to the reformer is connected to the midstream of connection piping for the water vaporizer 1. The water vaporizer 1 generates steam by heating with the electrical heater 2. The steam may be supplied to the reforming catalyst layer after being appropriately superheated in the water vaporizer or downstream thereof.

Also, air is supplied to the reforming catalyst layer, and here, air can be supplied to the reforming catalyst layer after being preheated in the water vaporizer. Steam or a mixed gas of air and steam can be obtained from the water vaporizer.

The steam or the mixed gas of air and steam is mixed with the hydrocarbon-based fuel and supplied to the reformer 3, particularly to the reforming catalyst layer 4 of the reformer 3. When a liquid fuel, such as kerosene, is used as the hydrocarbon-based fuel, the hydrocarbon-based fuel may be supplied to the reforming catalyst layer after being appropriately vaporized.

The reformed gas obtained from the reformer is supplied to the SOFC 6, particularly to the anode of the SOFC 6. Although not shown, air is appropriately preheated and supplied to the cathode of the SOFC.

Combustible components in the anode off-gas (gas discharged from the anode) are combusted by oxygen contained in a cathode off-gas (gas discharged from the cathode) at the SOFC outlet. In order to do this, ignition using the igniter 7 is possible. The outlets of both the anode and the cathode are open in the module container 8. The combustion gas is appropriately discharged from the module container.

The reformer and the SOFC are housed in one module container and modularized. The reformer is disposed at a position where it can receive heat from the SOFC. For example, when the reformer is located at a position where it receives thermal radiation from the SOFC, the reformer is heated by thermal radiation from the SOFC during electric power generation.

In the indirect internal reforming SOFC, the reformer is preferably disposed at a position where radiation heat can be directly transferred from the SOFC to the outer surface of the reformer. Therefore, it is preferred that there be substantially no obstacle between the reformer and the SOFC, that is, it is preferred to make the region between the reformer and the SOFC be an empty space. Also, the distance between the reformer and the SOFC is preferably as short as possible.

The reformer 3 is heated by the combustion heat of the anode off-gas generated in the combustion region 5. Also, when the temperature of the SOFC is higher than that of the reformer, the reformer is also heated by radiation heat from the SOFC.

Further, the reformer may be heated by heat generation by reforming. When the reforming is partial oxidation reforming, or when the reforming is autothermal reforming and heat generation by a partial oxidation reforming reaction is larger than endothermic heat by a steam reforming reaction, heat is generated with the reforming.

[Reforming-Stoppable State]

In this specification, a state in which all of the following conditions i to iv are satisfied is referred to as a reforming-stoppable state.

i) The anode temperature of the SOFC is steady.
ii) The above-described anode temperature is less than an oxidative degradation temperature.
iii) In the reformer, the hydrocarbon-based fuel is reformed, and a reformed gas having a composition suitable to be supplied to the anode is produced.
iv) The amount of this reformed gas produced is equal to or more than the requisite minimum flow rate FrMin for preventing the oxidative degradation of the anode when the anode temperature of the SOFC is a temperature that is equal to or more than the oxidative degradation temperature.

<Conditions i and ii>

The anode temperature means the temperature of the anode electrode, but may be the temperature of a stack-constituting member, such as a separator, near the anode when it is difficult to physically directly measure the temperature of the anode electrode. With respect to the location for the measurement of the anode temperature, it is preferred to use a position where the temperature becomes relatively high, more preferably a position where the temperature becomes the highest, in terms of safe control. A location where the temperature becomes high may be found by preliminary experiment or simulation.

The oxidative degradation temperature is a temperature at which the anode is oxidatively degraded. For example, the electrical conductivity of the anode material is measured by a DC four-terminal method, with the temperature varied, in a reducing or oxidizing gas atmosphere, and the oxidative degradation temperature may be determined as the lowest temperature at which the electrical conductivity in the oxidizing gas atmosphere becomes lower than that in the reducing gas atmosphere.

<Condition iii>

The condition iii means a state in which in the reformer, the hydrocarbon-based fuel is reformed, and a reformed gas having a composition suitable to be supplied to the anode is obtained. For example, when the hydrocarbon-based fuel includes a hydrocarbon-based fuel(s) having a carbon number of two or more, the condition iii means a state in which the reformed gas is reducing, and a concentration of C2+ component(s) (one or more compounds having a carbon number of two 2 or more) in the reformed gas is not more than a concentration which does not cause any problem in view of anode degradation and flow blockage due to carbon deposition. The concentration of the C2+ component(s) in this case is preferably 50 ppb or less as a mass fraction in the reformed gas.

<Condition iv>

The requisite minimum reformed gas flow rate FrMin for preventing the oxidative degradation of the anode is the smallest flow rate among the flow rates at which the anode electrode is not oxidatively degraded by the diffusion of the cathode off-gas into the interior of the anode from the anode outlet. This reformed gas flow rate may be found beforehand by performing an experiment or a simulation, while varying a reformed gas flow rate, in a state in which the anode temperature is maintained at the oxidative degradation temperature or higher.

The oxidative degradation of the anode may be judged, for example, by measuring the electrical conductivity of the anode electrode by experiment and comparing it with that of an anode electrode not oxidatively degraded. Alternatively, the oxidative degradation of the anode may be judged by calculating the compositional partial pressure of the anode gas by simulation using an equation including an advection-diffusion term and comparing it with equilibrium partial pressure in the oxidation reaction of the anode electrode. For example, when the anode electrode material is nickel, the equilibrium partial pressure of oxygen in an anode electrode oxidation reaction represented by the following formula is $1.2 \times 10^{-14}$ atm ($1.2 \times 10^{-9}$ Pa) at 800° C., and if the calculated value of the oxygen partial pressure of the anode is smaller than this value, then it can be judged that the anode electrode is not oxidatively degraded. Also when the anode temperature is a temperature other than 800° C., the maximum value of oxygen partial pressures at which the anode electrode is not oxidatively degraded may be found by equilibrium calculation, and if the calculated value of the oxygen partial pressure of the anode is smaller than this value, then it can be judged that the anode electrode is not oxidatively degraded.

The flow rate of the reformed gas supplied to the SOFC (the amount of the reformed gas produced in the reformer) in order to prevent the oxidative degradation of the anode is preferably a flow rate such that the reformed gas is combustible at the stage of being discharged from the anode after passing through the SOFC. When the smallest flow rate among the flow rates of thus combustible reformed gas is larger than the above-described requisite minimum reformed gas flow rate, the smallest flow rate among the flow rates of the combustible reformed gas may be considered to be a reformed gas flow rate "equal to or more than the requisite minimum flow rate" referred to in the condition iv. It is possible to judge whether a gas is combustible or not, for example, by sampling a gas in the combustion gas discharge line and performing composition analysis in experiment, or by calculating in simulation.

<FkE>

The flow rate of the hydrocarbon-based fuel supplied to the reformer (particularly, the reforming catalyst layer) in the reforming-stoppable state is represented as FkE.

FkE may be obtained beforehand by experiment or simulation. FkE may be found by performing an experiment or a simulation, while varying flow rates of fluids supplied to the indirect internal reforming SOFC, such as the flow rate of water (including steam) for steam reforming or autothermal reforming and the flow rate of air for autothermal reforming or partial oxidation reforming, which are supplied to the reformer, a cathode air flow rate, the flow rates of a fuel and air supplied to a burner, and flow rates of fluids, such as water and air, supplied to a heat exchanger; and electrical input and output to and from the indirect internal reforming SOFC, such as electrical heater output for heating the reformer, water and liquid fuel evaporators, the SOFC, fluid supply piping, and the like, and electrical input taken out from a thermoelectric conversion module and the like, that is, varying the operation conditions of the indirect internal reforming SOFC, and searching for FkE that steadily satisfies the conditions i to iv. FkE may be any value as long as the conditions i to iv are satisfied, but in terms of thermal efficiency, the smallest FkE is preferably used. The operation conditions of the indirect internal reforming SOFC, including the FkE, can be determined beforehand as operation conditions in the reforming-stoppable state.

[Fk0]

The flow rate of the hydrocarbon-based fuel supplied to the reformer at the point of time of the start of the shutdown method is represented as Fk0.

[FkCALC]

The calculated value of the flow rate of the hydrocarbon-based fuel capable of being reformed at a measured reforming catalyst layer temperature by a reforming method of a type performed after the start of the shutdown method (this flow rate is hereinafter sometimes referred to as a "reformable flow rate") is represented as FkCALC. In other words, FkCALC may be obtained by measuring the temperature of the reforming catalyst layer, and calculating the flow rate of the hydrocarbon-based fuel capable of being reformed in the reforming catalyst layer when the reforming catalyst layer has this temperature. At this time, it is assumed that the reforming method of the type performed after the start of the shutdown method is performed in the reforming catalyst layer (the type of the reforming method is hereinafter sometimes referred to as a reforming type). The reforming type is, for example, steam reforming, autothermal reforming, or partial oxidation reforming.

Specifically, when a certain type of reforming is performed before the start of the shutdown method, the same type of reforming as this may be performed after the start of the shutdown method. In this case, the flow rate (calculated value) of the hydrocarbon-based fuel capable of being reformed, when this type of reforming is performed in the reformer, is FkCALC. For example, when steam reforming is performed before the start of the shutdown method, steam reforming may also be continuously performed after the start of the shutdown method, and the flow rate of the hydrocarbon-based fuel capable of being reformed at the measured temperature of the reforming catalyst layer when steam reforming is performed in the reformer is FkCALC.

Alternatively, when a certain type of reforming (a first type of reforming) is performed before the start of the shutdown method, a different type of reforming from this (a second type of reforming) may be performed after the start of the shutdown method. In this case, the flow rate of the hydrocarbon-based fuel capable of being reformed, when the second type of reforming is performed in the reformer, is FkCALC. For example, when autothermal reforming is performed before the start of the shutdown method, the reforming may be switched to steam reforming after the start of the shutdown method. In this case, the flow rate (calculated value) of the hydrocarbon-based fuel capable of being reformed at the measured temperature of the reforming catalyst layer when steam reforming is performed is FkCALC.

[FkMinCALC]

A calculated value of the flow rate of the hydrocarbon-based fuel at which the reformed gas at the flow rate FrMin can be produced in the reformer at a measured reforming catalyst layer temperature by a reforming method of a type performed after the start of the shutdown method is represented as FkMinCALC. In other words, FkMinCALC may be obtained by measuring the temperature of the reforming catalyst layer, and calculating the flow rate of the hydrocarbon-based fuel at which the reformed gas at the flow rate FrMin can be produced in the reformer when the reforming catalyst layer has this temperature. At this time, it is assumed that the reforming method of the type performed after the start of the shutdown method is performed in the reforming catalyst layer.

[Case where Reforming Method is Changed Before and after Start of Shutdown Method]

The same type of reforming may be performed before and after the start of the shutdown method, but different types of reforming may be performed. For example, it is possible to perform steam reforming before the start of the shutdown method and perform autothermal reforming after starting the shutdown method. Also, it is possible to perform steam reforming before the start of the shutdown method and perform partial oxidation reforming after starting the shutdown method.

When the reforming type is changed before and after the start of the shutdown method, FkCALC and FkMinCALC are obtained assuming that a reforming type after the change of the reforming type is performed, as described above. Also, the reforming-stoppable state is related to the reforming type after the change of the reforming type. Therefore, FkE and FrMin are determined for a reforming-stoppable state when reforming after the change of the reforming type is performed.

[Measurement of Reforming Catalyst Layer Temperature]

The measured value of the reforming catalyst layer temperature is used for the calculation of FkCALC and FkMinCALC. In order to do this, the reforming catalyst layer temperature is measured. For example, the reforming catalyst layer temperature may be monitored (continuously measured).

When the monitoring of the temperature of the reforming catalyst layer has been performed since before the start of the shutdown method, the temperature monitoring may be continuously performed as it has been.

When the anode temperature falls below the oxidative degradation temperature, the reducing gas becomes unnecessary, and therefore, the supply of the hydrocarbon-based fuel to the reformer can be stopped to complete the shutdown method. Therefore, the monitoring of the temperature of the reforming catalyst layer may be continuously performed until the anode temperature falls below the oxidative degradation temperature.

An appropriate temperature sensor, such as a thermocouple, may be used for the measurement of the reforming catalyst layer temperature.

[Steps Included in Shutdown Method]

In the present invention, while the anode temperature does not fall below the oxidative degradation temperature, the following steps A to D are performed. When the anode temperature falls below the oxidative degradation temperature, the supply of the hydrocarbon-based fuel to the reformer can be stopped, regardless of the status of the implementation of steps A to D, to complete the shutdown method.

It is possible to stop the supply of fluids supplied to the indirect internal reforming SOFC, such as water (including steam) for steam reforming or autothermal reforming and air for autothermal reforming or partial oxidation reforming, which are supplied to the reformer, cathode air, the fuel and air supplied to the burner, and fluids, such as water and air, supplied to the heat exchanger; and the input and output of electricity to and from the indirect internal reforming SOFC, such as electrical heater output for heating the reformer, the water and liquid fuel evaporators, the cell stack, the fluid supply piping, and the like, and electrical input taken out from the thermoelectric conversion module and the like, according to the stop of the supply of the hydrocarbon-based fuel to the reformer.

Figure 6:
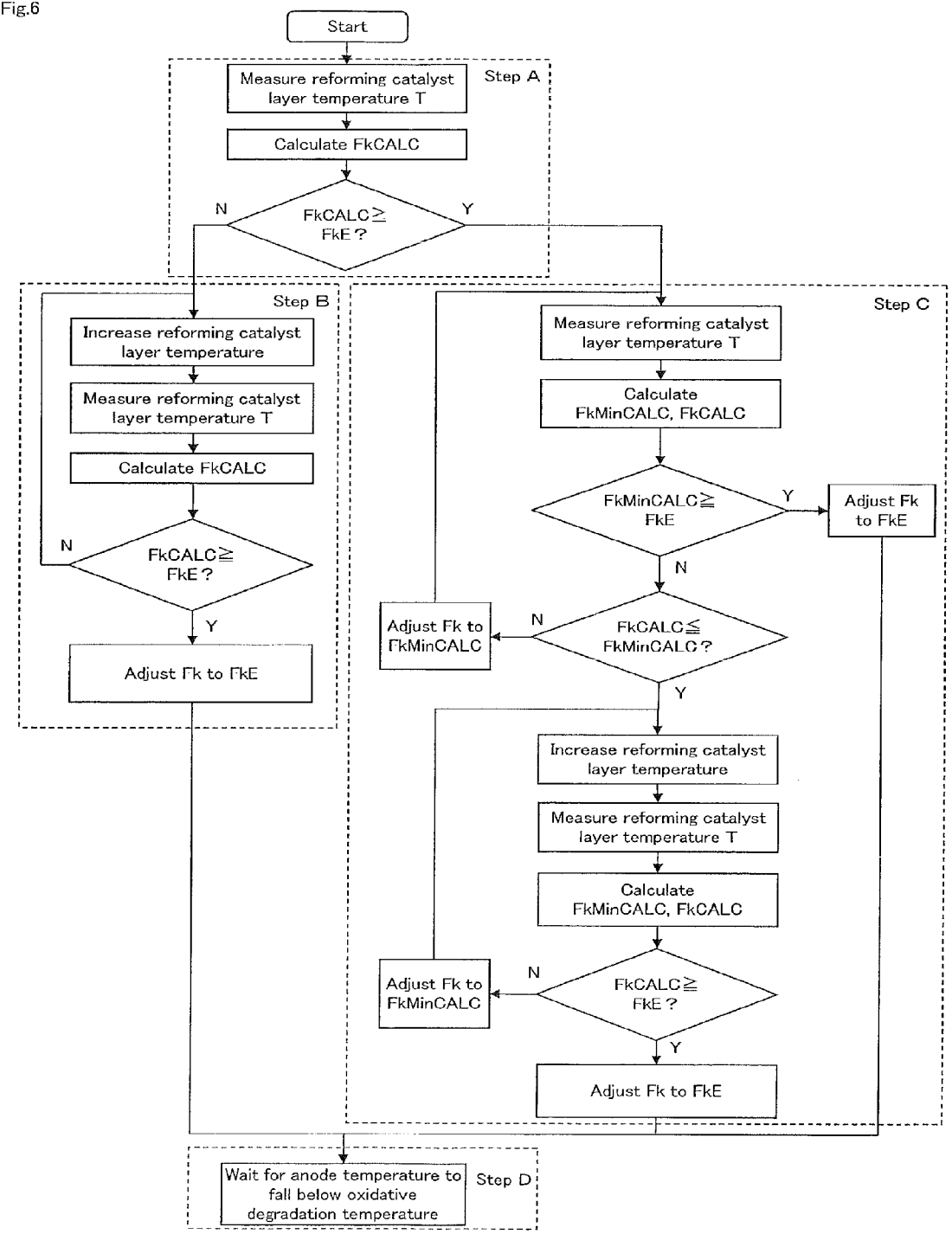
FIG. 6 is a flow chart for illustrating the method of the present invention.

FIG. 6 is a flow chart showing steps A to D in the shutdown method of the present invention. Apart from the procedure shown in this flow chart, the anode temperature is monitored, and when the anode temperature falls below the oxidative degradation temperature of the anode, the supply of the hydrocarbon-based fuel to the reformer is stopped, regardless of steps A to D.

The shutdown method includes steps A to D, but it is not necessary to actually perform all of steps A to D, and only part of steps A to D may be performed according to the circumstances.

[Step A]

First, a reforming catalyst layer temperature T is measured. Then, a reformable flow rate FkCALC is calculated based on this temperature T. Further, the magnitude relationship between the flow rate FkE of the hydrocarbon-based fuel supplied to the reformer in the above-described reforming-stoppable state and this FkCALC is checked.

[Step B]

When FkCALC<FkE in step A, the following steps B1 to B4 are performed in order. "FkCALC<FkE" is considered to mean that the hydrocarbon-based fuel at the flow rate FkE cannot be reformed in the reformer (by a reforming type after change, if the reforming type is changed).

Step B1

First, step B1 is performed. In other words, the step of increasing the temperature of the reforming catalyst layer is performed.

For example, the temperature of the reforming catalyst layer is increased using an appropriate heat source, such as a heater or a burner annexed to the reformer.

Step B2

Then, step B2 is performed. In other words, the step of measuring a reforming catalyst layer temperature T, calculating FkCALC using this T, and comparing the values of this FkCALC and FkE is performed.

Step B3

When FkCALC<FkE in step B2, the step of returning to step B1 is performed. In other words, while FkCALC<FkE, steps B1 to B3 are repeatedly performed. During this time, the temperature of the reforming catalyst layer increases.

In performing steps B2 and B3, the temperature increase in step B1 may be stopped once, but while steps B2 and B3 are performed, step B1 may be continued.

Step B4

When FkCALC≥FkE in step B2, the step of adjusting the flow rate of the hydrocarbon-based fuel supplied to the reformer (represented as Fk) from Fk0 to FkE and moving on to step D is performed.

"FkCALC≥FkE" is considered to mean that the hydrocarbon-based fuel at the flow rate FkE can be reformed in the reforming catalyst layer (by a reforming type after change, if the reforming type is changed).

At this time, in a case where the reforming type should be changed before and after the start of the shutdown method, the fuel flow rate is adjusted from Fk0 to FkE, and the reforming type is changed. By this method, it is possible to prevent the oxidative degradation of the anode with the reformed gas, while reliably reforming the hydrocarbon-based fuel.

[Step C]

When FkCALC≥FkE in step A, step C is performed. "FkCALC≥FkE" is considered to mean that the hydrocarbon-based fuel at the flow rate FkE can be reformed in the reformer (by a reforming type after change, if the reforming type is changed before and after the start of the shutdown method).

Step C1

First, a reforming catalyst layer temperature T is measured, FkMinCALC and FkCALC are calculated based on this T, and the values of this FkMinCALC and FkE are compared.

Step C2

When FkMinCALC≤FkE in step C1, the step of setting the flow rate (Fk) of the hydrocarbon-based fuel supplied to the reformer to FkE and moving on to step D is performed.

When the reforming type is changed before and after the start of the shutdown method, and when step C2 is performed without performing step C3 even once, that is, when FkMinCALC≥FkE is satisfied in the first-time step C1, the step of adjusting the flow rate Fk of the hydrocarbon-based fuel supplied to the reformer from Fk0 to FkE, changing the reforming type, and moving on to step D is performed.

Step C3

When FkMinCALC<FkE in step C1, the value of FkMinCALC and the value of FkCALC which have been calculated in step C1 are compared.

Step C4

When FkCALC>FkMinCALC in step C3, the flow rate Fk of the hydrocarbon-based fuel supplied to the reformer is set to FkMinCALC, and the method returns to step C1. In other words, while FkMinCALC<FkE and FkCALC>FkMinCALC, steps C1, C3, and C4 are repeatedly performed.

When the reforming type should be changed before and after the start of the shutdown method, the fuel flow rate Fk is adjusted from Fk0 to FkMinCALC, and the reforming type is changed, in the first-time step C4.

Step C5

When FkCALC≤FkMinCALC in step C3, steps C6 to C9 are performed in order.

Step C6

The temperature of the reforming catalyst layer is increased. Step C6 can be performed as in step B1.

Step C7

The reforming catalyst layer temperature T is measured, FkCALC and FkMinCALC are calculated using this measured temperature T, and the value of this FkCALC is compared with the value of FkE.

Step C8

When FkCALK<FkE in step C7, the flow rate Fk of the hydrocarbon-based fuel supplied to the reformer is set to FkMinCALC (the value obtained in step C7), and the method returns to step C6.

When the reforming type should be changed before and after the start of the shutdown method, and when step C8 is performed without performing step C4 even once, the fuel flow rate Fk is adjusted from Fk0 to FkMinCALC, and the reforming type is changed, in the first-time step C8.

Step C9

When FkCALK≥FkE in step C7, the flow rate Fk of the hydrocarbon-based fuel supplied to the reformer is set to FkE, and the method moves on to step D.

When the reforming type should be changed before and after the start of the shutdown method, and when step C9 is performed without performing steps C4 and C8 even once, the fuel flow rate Fk is adjusted from Fk0 to FkE, and the reforming type is changed, in the first-time step C9.

In step C9, Fk may be immediately set to FkE, or Fk may be gradually set to FkE (see case 3 described later).

[Step D]

In step D, the method waits for the anode temperature to fall below the oxidative degradation temperature. During this time, the flow rate of the hydrocarbon-based fuel is maintained at FkE, and the flow rates of fluids supplied to the indirect internal reforming SOFC, such as the flow rate of water (including steam) for steam reforming or autothermal reforming and the flow rate of air for autothermal reforming or partial oxidation reforming, which are supplied to the reformer, the cathode air flow rate, the flow rates of the fuel and air supplied to the burner, and the flow rates of fluids, such as water and air, supplied to the heat exchanger; and the input and output of electricity to and from the indirect internal reforming SOFC, such as electrical heater output for heating the reformer, the water and liquid fuel evaporators, the cell stack, the fluid supply piping, and the like, and electrical input taken out from the thermoelectric conversion module and the like, can be maintained in the operation conditions in the reforming-stoppable state determined beforehand. In other words, the operation conditions of the indirect internal reforming SOFC can be maintained in the operation conditions of the indirect internal reforming SOFC in the reforming-stoppable state determined beforehand. The anode temperature decreases with time, and therefore, eventually, the anode temperature falls below the oxidative degradation temperature. The anode temperature may be appropriately monitored (continuously measured) using a temperature sensor, such as a thermocouple.

The monitoring of the anode temperature is preferably started immediately after the shutdown method is started. If the temperature monitoring has been performed since before the start of the shutdown method, then the temperature monitoring may be continued as it has been also when the shutdown method is performed.

When the anode temperature falls below the oxidative degradation temperature, the supply of the hydrocarbon-based fuel to the reformer can be stopped to complete the shutdown method.

In step C and the subsequent steps, from a state in which it is possible to reform the hydrocarbon-based fuel at a flow rate at which the reformed gas at the flow rate FrMin can be produced in the reformer, and in which the hydrocarbon-based fuel at this flow rate is supplied to the reformer, it is possible to set flow rate Fk of the fuel supplied to the reformer to FkE (set operation conditions to the operation conditions in the reforming-stoppable state) and bring the internal reforming solid oxide fuel cell to the reforming-stoppable state without allowing unreformed hydrocarbon-based fuel to flow into the anode. But, generally, within a temperature range preferred for reforming, as the reforming catalyst layer temperature becomes higher, the reformed gas flow rate becomes larger. Therefore, while the reforming catalyst layer temperature is higher than the temperature in the reforming-stoppable state, the flow rate of the hydrocarbon-based fuel at which the reformed gas at the flow rate FrMin can be produced in the reformer is smaller than FkE. Therefore, if Fk is set to FkE, then an excessive amount of hydrocarbon-based fuel is consumed. Also, generally, as the supplied hydrocarbon-based fuel becomes more, more time is required for cooling.

On the other hand, in step C and the subsequent steps, by supplying the hydrocarbon-based fuel at the flow rate FkMinCALC to the reformer, it is possible to control the hydrocarbon-based fuel to a requisite minimum amount. But, when the supply of the hydrocarbon-based fuel at the flow rate FkMinCALC is continued, FkCALC≤FkMinCALC may be satisfied due to the decrease of the reforming catalyst layer temperature. When FkCALC≤FkMinCALC is satisfied, and if FkE≤FkCALC, it is possible to set the fuel flow rate Fk to FkE (set operation conditions to the operation conditions in the reforming-stoppable state) and bring the internal reforming solid oxide fuel cell to the reforming-stoppable state without allowing the unreformed hydrocarbon-based fuel to flow into the anode. But, in this case, when FkE≤FkMinCALC is satisfied before FkCALC≤FkMinCALC is satisfied, it could have been possible to set the fuel flow rate Fk to FkE (set operation conditions to the operation conditions in the reforming-stoppable state) and bring the internal reforming solid oxide fuel cell to the reforming-stoppable state without allowing the unreformed hydrocarbon-based fuel to flow into the anode. This means that an excessive amount of hydrocarbon-based fuel has been supplied. When FkCALC≤FkMinCALC is satisfied, and if FkCALC<FkE, it is not possible from this point of time to set the fuel flow rate Fk to FkE (set operation conditions to the operation conditions in the reforming-stoppable state) and bring the internal reforming solid oxide fuel cell to the reforming-stoppable state without allowing the unreformed hydrocarbon-based fuel to flow into the anode.

Therefore, when FkMinCALC≥FkE is satisfied, by setting the fuel flow rate Fk to FkE (setting operation conditions to the operation conditions in the reforming-stoppable state) (step C2), it is possible to bring the internal reforming solid oxide fuel cell to the reforming-stoppable state without allowing the unreformed hydrocarbon-based fuel to flow into the anode, while suppressing the amount of the hydrocarbon-based fuel supplied to the reformer.

Also, when FkCALC≤FkMinCALC is satisfied, by increasing the temperature of the reforming catalyst layer until FkCALC≥FkE is satisfied, and then setting the fuel flow rate Fk to FkE (setting operation conditions to the operation conditions in the reforming-stoppable state) (step C5), it is possible to bring the internal reforming solid oxide fuel cell to the reforming-stoppable state without allowing the unreformed hydrocarbon-based fuel to flow into the anode.

When neither of the above FkMinCALC≥FkE and FkCALC≤FkMinCALC are satisfied, that is, when FkMinCALC<FkE and FkCALC>FkMinCALC, by supplying the hydrocarbon-based fuel at the flow rate FkMinCALC to the reformer (step C4), it is possible to suppress the amount of the hydrocarbon-based fuel to a requisite minimum amount.

As described above, according to the operation method of the present invention, it is possible to prevent the oxidative degradation of the anode, perform reliable reforming, and decrease the amount of hydrocarbon-based fuel and shutdown time (time from the start of the shutdown method until the anode temperature falls below the oxidative degradation temperature) required for shutdown.

[Case 1]

One example of the shutdown method of the present invention will be described using FIG. 2. In FIGS. 2(a) to (c), the horizontal axis is elapsed time from a point of time when the shutdown method of the present invention is started. In (a) in this figure, the vertical axis is the flow rate of the reformed gas obtained from the reformer, in (b), the vertical axis is temperature, and in (c), the vertical axis is the flow rate of the hydrocarbon fuel (flow rate Fk of the hydrocarbon-based fuel supplied to the reformer, calculated FkCALC and FkMinCALC) (the same applies to FIGS. 3 to 5).

The monitoring of the reforming catalyst layer temperature and the monitoring of the anode temperature have been continuously performed since before the point of time of the start of the shutdown method (the same applies to the subsequent cases).

Figure 2:
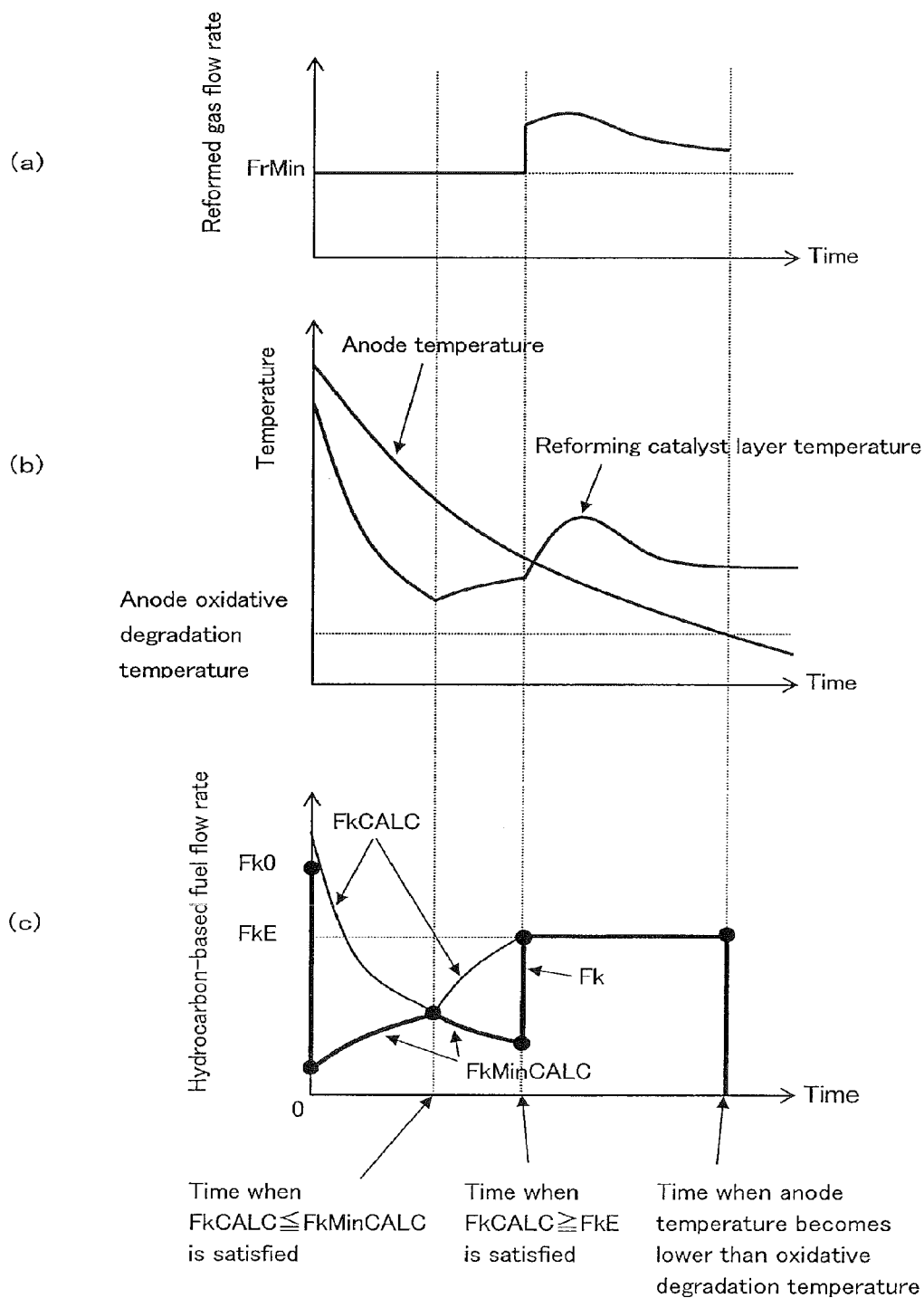
FIG. 2 involves conceptual graphs for illustrating a method of the present invention, and (a) shows a relationship between elapsed time and a reformed gas flow rate, (b) shows a relationship between elapsed time and temperature, and (c) shows a relationship between elapsed time and a hydrocarbon-based fuel flow rate.

As shown in FIG. 2, immediately after the shutdown method is started, step A is performed. In other words, the reforming catalyst layer temperature T is measured, the FkCALC is calculated using this T, and the values of this FkCALC and FkE are compared.

In this case, FkCALC≥FkE, and therefore, step C is performed.

In step C1, the reforming catalyst layer temperature T is measured, FkMinCALC and FkCALC are calculated based on this T, and the values of this FkMinCALC and FkE are compared.

In this case, FkMinCALC<FkE, and therefore, step C3, instead of step C2, is performed.

In step C3, the values of FkMinCALC and FkCALC which have been calculated in step C1 are compared.

In this case, FkCALC>FkMinCALC, and therefore, the step of setting the flow rate of the hydrocarbon-based fuel supplied to the reformer to FkMinCALC and returning to step C1 is performed in step C4. When the reforming type should be changed before and after the start of the shutdown method, the flow rate of the hydrocarbon-based fuel is adjusted from Fk0 to FkMinCALC, and the reforming type is changed, in the first-time step C4.

While FkMinCALC<FkE and FkCALC>FkMinCALC, steps C1, C3, and C4 are repeatedly performed. For a while, steps C1, C3, and C4 are repeated, and during this time, the reforming catalyst layer temperature decreases with time, FkMinCALC increases with time, and FkCALC decreases with time.

For a period from the point of time of the start of the shutdown method until FkMinCALC≥FkE or FkCALC≤FkMinCALC is satisfied, the flow rate of the hydrocarbon-based fuel supplied to the reformer is set to FkMinCALC (Fk=FkMinCALC). Therefore, in FIG. 2 (c), during this period, a line representing FkMinCALC and a line representing Fk overlap each other.

In the case of FIG. 2, FkCALC becomes equal to or less than FkMinCALC before FkMinCALC becomes equal to or more than FkE. When FkCALC becomes equal to or less than FkMinCALC, step C5 is performed. In other words, steps C6 to C9 are performed in order.

In step C6, the temperature of the reforming catalyst layer is increased. The temperature increase in step 6 is performed in order to increase the reforming catalyst layer temperature so that the hydrocarbon-based fuel at the flow rate FkE can be reformed. The temperature of the reforming catalyst layer may be increased by an appropriate heat source, such as a burner or a heater annexed to the reformer, until FkCALC≥FkE is satisfied.

In step C7, the reforming catalyst layer temperature T is measured, FkCALC and FkMinCALC are obtained using this T, and the value of FkCALC obtained is compared with the value of FkE.

While FkCALC<FkE, in step C8, the flow rate (Fk) of the hydrocarbon-based fuel supplied to the reformer is set to FkMinCALC obtained in step C7, and the method returns to step C6.

Steps C6, C7, and C8 are repeated (during this time, the temperature increase in step C6 may be continuously performed), and with time, the temperature of the reforming catalyst layer increases, FkMinCALC decreases, and FkCALC increases. For a period after FkCALC becomes equal to or less than FkMinCALC until FkCALC≥FkE is satisfied, the flow rate of the hydrocarbon-based fuel is FkMinCALC. Therefore, in FIG. 2(c), during this period, a line representing FkMinCALC and a line representing Fk overlap each other.

When FkCALC≥FkE is satisfied, the flow rate (Fk) of the hydrocarbon-based fuel supplied to the reformer is set to FkE (step C9). At this time, operation conditions, including other operation conditions of the indirect internal reforming SOFC, may be set to the operation conditions in the reforming-stoppable state.

Then, the method moves on to step D, and waits until the anode temperature falls below the oxidative degradation temperature.

When the anode temperature becomes less than the oxidative degradation temperature, the flow rate of the hydrocarbon-based fuel supplied to the reformer can be set to zero to complete the shutdown method.

It is noted that, if the anode temperature falls below the oxidative degradation temperature after the start of the shutdown method, then the flow rate of the hydrocarbon-based fuel can be set to zero at this point of time.

By operating in this manner, it is possible to supply the reformed gas at the requisite minimum flow rate or more to the anode, while reliably performing reforming.

[Case 2]

In the above case, FkCALC becomes equal to or less than FkMinCALC before FkMinCALC becomes equal to or more than FkE, and therefore, at a point of time when FkCALC becomes equal to or more than FkE in step C7, Fk is set to FkE (step C9). In the present case, FkMinCALC becomes equal to or more than FkE before FkCALC becomes equal to or less than FkMinCALC, and therefore, at a point of time when FkMinCALC becomes equal to or more than FkE in step C1, Fk is set to FkE (step C2). This case will be described using FIG. 3.

Until FkMinCALC≥FkE is satisfied or FkCALC≤FkMinCALC is satisfied (while steps C1, C3, and C4 are repeated starting from step A), case 2 is similar to case 1.

Figure 3:
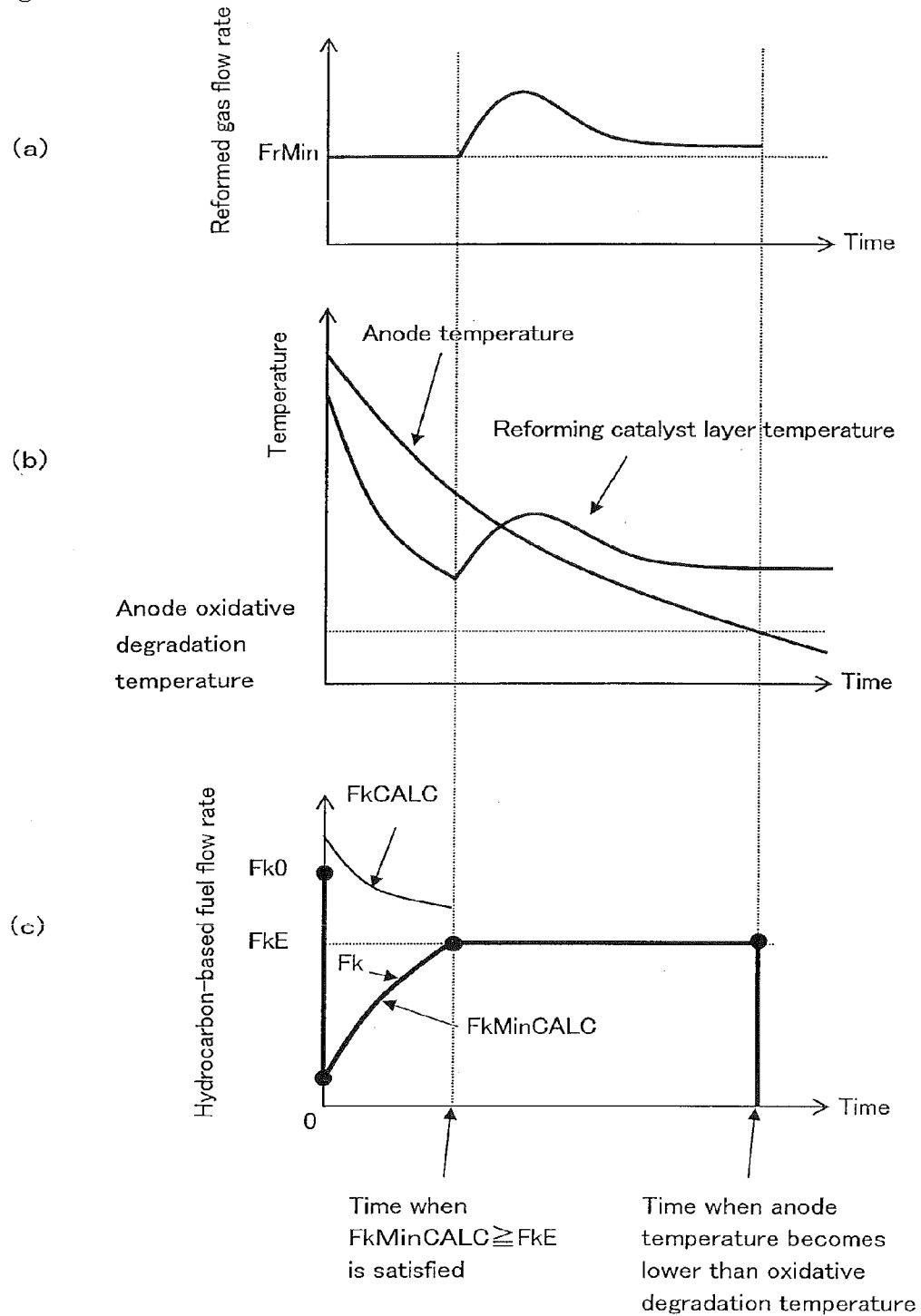
FIG. 3 involves conceptual graphs for illustrating the method of the present invention, and (a) shows a relationship between elapsed time and a reformed gas flow rate, (b) shows a relationship between elapsed time and temperature, and (c) shows a relationship between elapsed time and a hydrocarbon-based fuel flow rate.

In the case of FIG. 3, FkMinCALC becomes equal to or more than FkE before FkCALC becomes equal to or less than FkMinCALC. At a point of time when FkMinCALC becomes equal to or more than FkE, immediately, Fk is set to FkE, and the method moves on to step D (step C2). At this time, operation conditions, including other operation conditions of the indirect internal reforming SOFC, may be set to the operation conditions in the reforming-stoppable state.

Step D and the subsequent steps are similar to those of case 1.

In this case, step C5 (steps C6 to C9) is not performed (step B is not performed either).

It is noted that, if the anode temperature falls below the oxidative degradation temperature after the start of the shutdown method, then the flow rate of the hydrocarbon-based fuel may be set to zero at this point of time.

By operating in this manner, it is possible to supply the reformed gas at the requisite minimum flow rate or more to the anode, while reliably performing reforming.

[Case 3]

Figure 7:
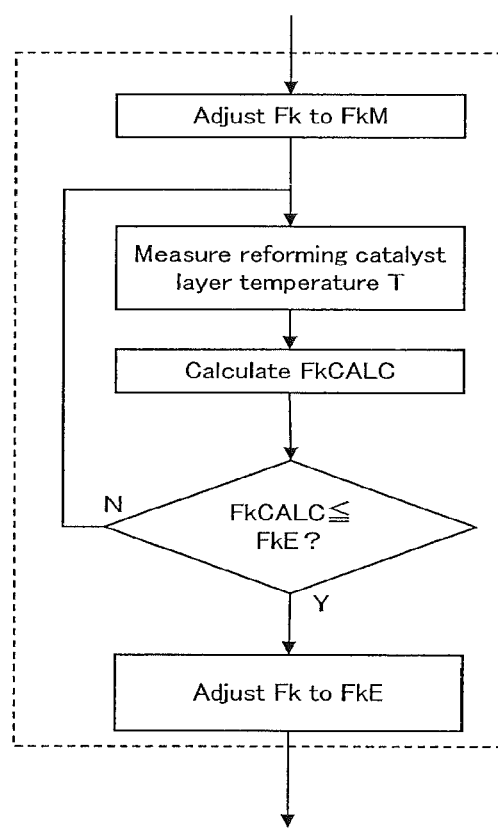
FIG. 7 is a flow chart for illustrating a modified embodiment of step C9.

In case 1, at a point of time when FkCALC becomes equal to or more than FkE in step C7, Fk is immediately set to FkE (step C9). In the present case, in step C9, the increase in the flow rate from Fk to FkE is performed gradually, particularly, stepwise. This case will be described using FIG. 4. A procedure for gradually setting Fk to FkE is shown in FIG. 7 in the form of a flow chart.

Until FkCALC≥FkE is satisfied in step C7, case 3 is similar to case 1. As in FIG. 2, also in FIG. 4, until FkMinCALC≥FkE is satisfied or FkCALC≤FkMinCALC is satisfied, and until FkCALC≥FkE is satisfied (while steps C6, C7, and C8 are repeated), a line representing FkMinCALC and a line representing Fk overlap each other.

Figure 4:
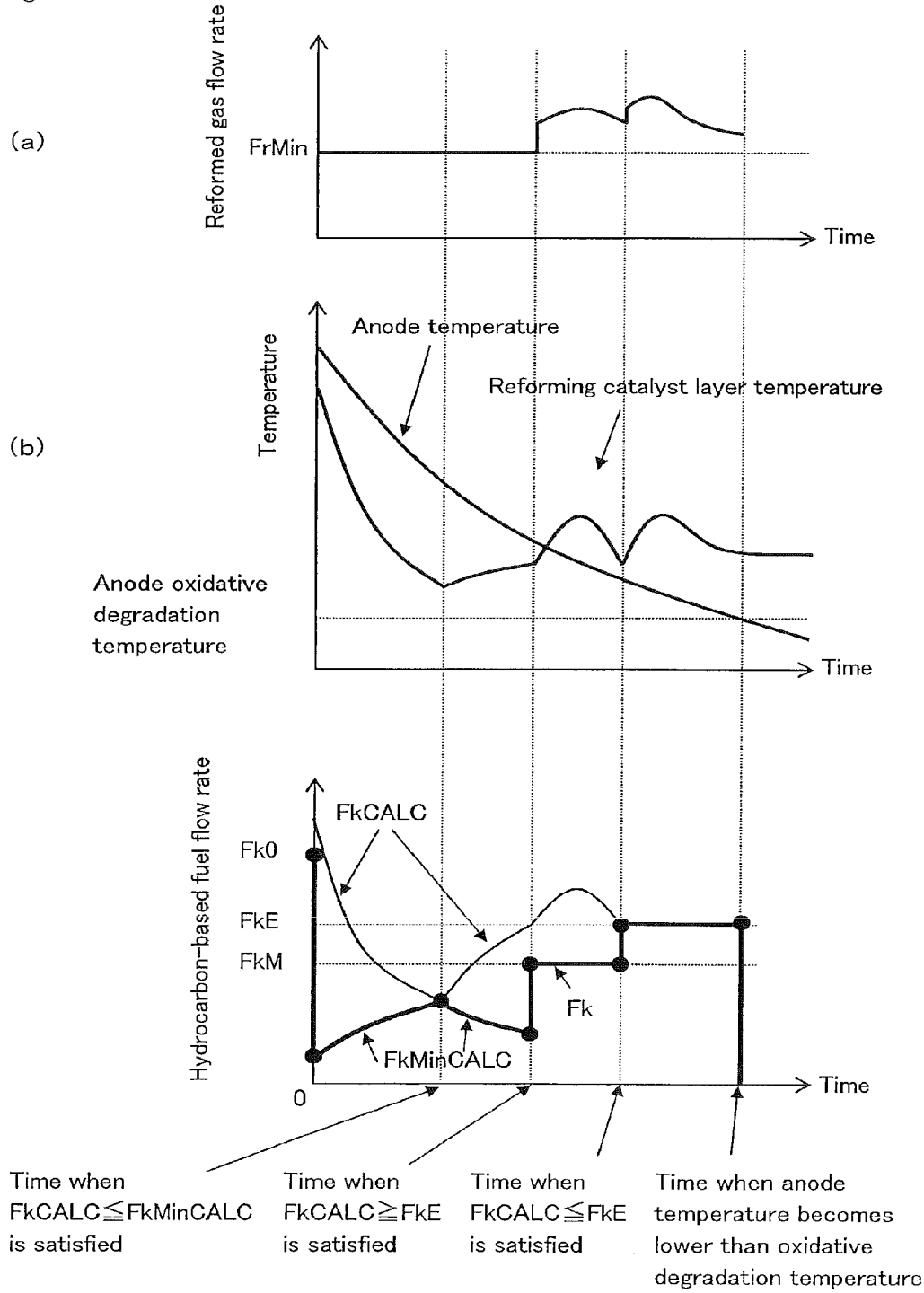
FIG. 4 involves conceptual graphs for illustrating the method of the present invention, and (a) shows a relationship between elapsed time and a reformed gas flow rate, (b) shows a relationship between elapsed time and temperature, and (c) shows a relationship between elapsed time and a hydrocarbon-based fuel flow rate.

In the case of FIG. 4, at a point of time when FkCALC≥FkE is satisfied in step C7, first, Fk is increased to FkM in step C9. Here, FkM is an intermediate flow rate that is larger than FkMinCALC and is smaller than FkE.

After Fk is increased to FkM, the measurement of the reforming catalyst layer temperature T, the calculation of the reformable flow rate FkCALC using this T, and the supply of the hydrocarbon-based fuel at the flow rate FkM to the reformer are continued until FkCALC<FkE is satisfied. Immediately after Fk is increased to FkM, the reforming catalyst layer temperature increases due to the increase in heat input to the reformer, and FkCALC becomes a value that exceeds FkE. But, the heat input to the reformer is smaller than that in the reforming-stoppable state, and therefore, the reforming catalyst layer temperature subsequently decreases. When FkCALC≤FkE is satisfied, Fk is set to FkE, and the method moves on to step D. At this time, other operation conditions may also be set to the operation conditions in the reforming-stoppable state. Then, the method waits until the anode temperature becomes less than the oxidative degradation temperature, and then the supply of the hydrocarbon-based fuel to the reformer can be stopped. The calculation of FkCALC may be stopped at a point of time when FkCALC≤FkE is satisfied. The increase in the temperature of the reforming catalyst layer may be stopped during a period from the point of time when FkCALC≥FkE is satisfied in step C7 (a point of time when Fk is set to FkM) to the point of time when FkCALC≤FkE is satisfied (a point of time when Fk is set to FkE).

In the above description, only one intermediate flow rate is used, but this is not limiting, and a plurality of intermediate flow rates may be used.

In other words, it is possible to use one or a plurality (this number is represented as J; J is an integer of 1 or more) of intermediate flow rates FkM(j) (wherein, j is an integer that satisfies 1≤j≤J), where FkM(j)<FkM(j+1), increase Fk to FkM(1) when FkCALC≥FkE is satisfied in step C7, increase Fk to FkM(2) when FkCALC≤FkE is satisfied, and increase Fk to FkM(3) when FkCALC≤FkE is satisfied for the second time, thus increase Fk to FkM(j) at a point of time when FkCALC≤FkE is satisfied for the j-th time while increasing j by 1 at a time, and set Fk to FkE when FkCALC≤FkE is satisfied for the last time (the J-th time). At this time, other operation conditions may also be set to the operation conditions in the reforming-stoppable state. Then, the method waits until the anode temperature becomes less than the oxidative degradation temperature, and then the supply of the hydrocarbon-based fuel to the reformer can be stopped. The calculation of FkCALC may be stopped at a point of time when FkCALC≤FkE is satisfied for the last time. The increase in the temperature of the reforming catalyst layer may be stopped during a period from a point of time when FkCALC≥FkE is satisfied in step C7 (a point of time when Fk is set to FkM(1)) to the point of time when FkCALC≤FkE is satisfied for the last time (a point of time when Fk is set to FkE).

The intermediate flow rate(s) FkM(j) may be determined, for example, by calculating a flow rate(s) by equally dividing the difference between FkMinCALC when FkCALC≥FkE is satisfied in step C7 and FkE by J+1. It is preferred to make J as large as possible and make the interval of FkM(j) as small as possible, within the allowable range of the memory consumption of a flow rate controlling means, and within a range in which the interval exceeds the precision of a pressure increasing means and flow rate controlling and measuring means, in terms of the reduction of the integrated value of the flow rates of the hydrocarbon-based fuel, that is, thermal efficiency.

Of course, also in this case, if the anode temperature falls below the oxidative degradation temperature, then the supply of the hydrocarbon-based fuel to the reformer can be stopped at this point of time to complete the shutdown method.

In case 3, it is possible to reduce the amount of the hydrocarbon-based fuel supplied until the stop of reforming and shorten shutdown time compared with case 1.

[Case 4]

A case where FkCALC calculated in step A is smaller than the flow rate FkE of the hydrocarbon-based fuel supplied to the reformer in the reforming-stoppable state, that is, the case of FkCALC<FkE, will be described using FIG. 5. In other words, a case where step B is performed will be described.

After the start of the shutdown method, step A is immediately performed, and the measurement of the reforming catalyst layer temperature T, and the calculation of FkCALC based on this T are performed. FkCALC<FkE, and therefore, step C is not performed, and step B is performed.

Figure 5:
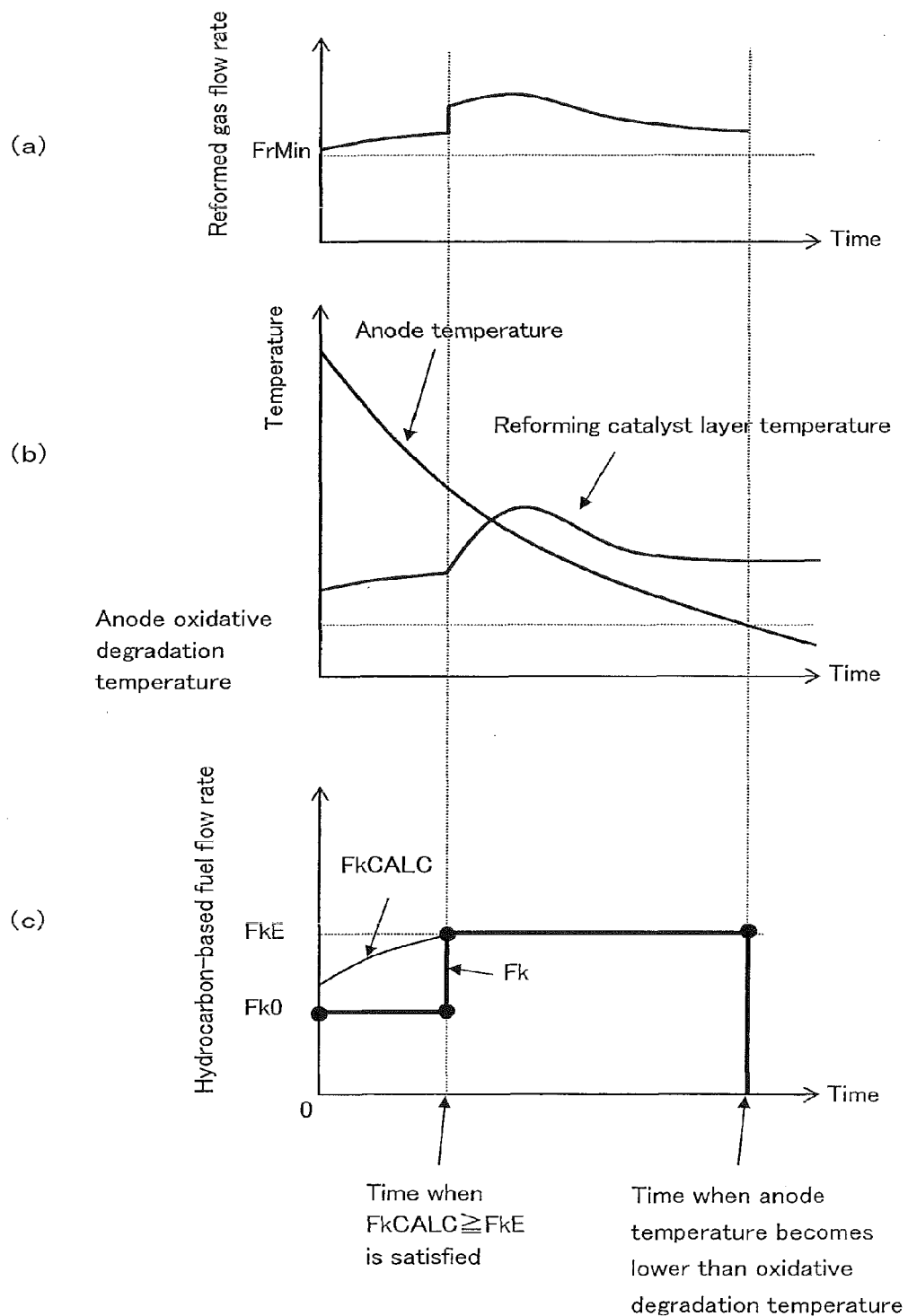
FIG. 5 involves conceptual graphs for illustrating the method of the present invention, and (a) shows a relationship between elapsed time and a reformed gas flow rate, (b) shows a relationship between elapsed time and temperature, and (c) shows a relationship between elapsed time and a hydrocarbon-based fuel flow rate.

In this case, the temperature of the reforming catalyst layer is increased by an appropriate heat source, such as a burner and a heater annexed to the reformer, until FkCALC≥FkE is satisfied, so that the hydrocarbon-based fuel at the flow rate FkE can be reformed, as shown in FIG. 5. Specifically, the temperature of the reforming catalyst layer is increased in step B1. Then, in step B2, the reforming catalyst layer temperature T is measured, FkCALC is calculated using this T, and the value of this FkCALC is compared with the value of FkE. Here, when FkCALC<FkE, the method returns to step B1. While FkCALC<FkE, steps B1, B2, and B3 are repeated (during this time, the temperature increase in step B1 may be continued).

When FkCALC≥FkE is satisfied, Fk is changed from Fk0 to FkE. At this time, other operation conditions may also be set to the operation conditions in the reforming-stoppable state.

Step D and the subsequent steps are similar to those of case 1.

[Regarding "Can Be Reformed"]

"The hydrocarbon-based fuel at a certain flow rate can be reformed (or is capable of being reformed) in the reforming catalyst layer" described herein refers to that when the hydrocarbon-based fuel at this flow rate is supplied to the reforming catalyst layer, the composition of the gas discharged from the reforming catalyst layer becomes a composition suitable to be supplied to the anode of the SOFC.

For example, "can be reformed in the reforming catalyst layer" may be that the supplied hydrocarbon-based fuel can be decomposed to a C1 compound(s) (a compound(s) having a carbon number of 1). In other words, "can be reformed in the reforming catalyst layer" means a case where reforming can proceed in the reforming catalyst layer until a composition is obtained in which a C2+ component(s) (a component(s) having a carbon number of 2 or more) in the gas at the outlet of the reforming catalyst layer has a concentration or less, which concentration does not cause the problems of anode degradation and flow blockage due to carbon deposition. The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, $CO_2$, and the like contained in the gas at the outlet of the reforming catalyst layer may be lower than their equilibrium partial pressures of oxidation reactions of the anode electrode. For example, when the anode electrode material is nickel, and the anode temperature is 800° C., the partial pressure of $O_2$ contained in the gas at the outlet of the reforming catalyst layer may be less than $1.2 \times 10^{-14}$ atm ($1.2 \times 10^{-9}$ Pa), the partial pressure ratio of $H_2O$ to $H_2$ may be less than $1.7 \times 10^2$, and the partial pressure ratio of $CO_2$ to CO may be less than $1.8 \times 10^2$.

[Calculation of FkCALC]

The method for calculating the flow rate of the hydrocarbon-based fuel capable of being reformed in the reforming catalyst layer, based on the measured temperature of the reforming catalyst layer, will be described below.

The meaning of "capable of being reformed (can be reformed)" is as described above, and the flow rate of the hydrocarbon-based fuel capable of being reformed in the reforming catalyst layer (reformable flow rate) refers to a flow rate such that when the hydrocarbon-based fuel at this flow rate is supplied to the reforming catalyst layer, the composition of the gas discharged from the reforming catalyst layer becomes a composition suitable to be supplied to the anode of the SOFC.

For example, the reformable flow rate in the reforming catalyst layer may be any flow rate that is equal to or less than the maximum value of flow rates at which the supplied hydrocarbon-based fuel can be decomposed to a C1 compound(s) (a compounds) having a carbon number of 1). The reformable flow rate may be this maximum value, or may be a value obtained by dividing this maximum value by a safety factor (a value that exceeds 1, for example 1.4).

The reformable flow rate depends on the temperature of the reforming catalyst layer. Therefore, the calculation of the reformable flow rate in the reforming catalyst layer is performed based on the measured temperature of the reforming catalyst layer.

The reformable flow rate FkCALC in the reforming catalyst layer may be obtained beforehand as a function of the temperature T of the reforming catalyst layer by experiment (FkCALC is represented also as FkCALC(T) to explicitly show that it is a function of temperature). Also, it is possible to determine the reformable flow rate by dividing the function obtained by experiment by a safety factor, or offsetting the temperature to the safe side. The unit of FkCALC(T) is, for example, mol/s.

The reformable flow rate FkCALC(T) may be a function of only the temperature T. But, this is not limiting, and the reformable flow rate FkCALC may be a function having, in addition to the temperature T, a variable other than T, such as the volume of the catalyst layer, the concentration of the gas component, or time. In this case, when the reformable flow rate FkCALC(T) is calculated, it is possible to appropriately obtain a variable other than T, and calculate the reformable flow rate FkCALC(T) from the variable other than T and the measured T.

[Calculation of FkMinCALC]

The method for calculating the flow rate FkMinCALC of the hydrocarbon-based fuel at which the reformed gas at the flow rate FrMin can be produced in the reformer in the reforming catalyst layer, based on the measured temperature of the reforming catalyst layer, will be described below.

The flow rate of the hydrocarbon-based fuel at which the reformed gas at the flow rate FrMin can be produced in the reformer may be any flow rate that is equal to or more than a flow rate at which the flow rate of the reformed gas is exactly FrMin. The flow rate of the hydrocarbon-based fuel at which the reformed gas at the flow rate FrMin can be produced in the reformer may be the flow rate of the hydrocarbon-based fuel at which the reformed gas at a flow rate that is exactly FrMin can be produced in the reformer, or may be a value obtained by multiplying this flow rate by a safety factor (a value that exceeds 1, for example 1.4).

FkMinCALC depends on the temperature of the reforming catalyst layer. Therefore, FkMinCALC is performed based on the measured temperature of the reforming catalyst layer.

FkMinCALC may be calculated by finding a relation equation between the temperature of the reforming catalyst layer and FkMinCALC beforehand by equilibrium calculation or preliminary experiment, and substituting the measured temperature T of the reforming catalyst layer into this relation equation. Also, it is possible to determine FkMinCALC by multiplying the function obtained by experiment by a safety factor, or offsetting the temperature to the safe side. The unit of FkMinCALC is, for example, mol/s.

FkMinCALC may be a function of only the temperature T. But, this is not limiting, and FkMinCALC may be a function having, in addition to the temperature T, a variable other than T, such as pressure, the concentration of the gas component, or time. In this case, when FkMinCALC is calculated, it is possible to appropriately obtain a variable other than T, and calculate FkMinCALC from the variable other than T and the measured T.

[Position for Measurement of Reforming Catalyst Layer Temperature]

A position for the measurement of the reforming catalyst layer temperature will be described in detail below. This measurement position may be used in the preliminary experiment for finding FkCALC, and when the temperature of the reforming catalyst layer is measured in steps A to C.

<Case where there is One Temperature Measurement Point>

Temperature Measurement Position

When there is a single temperature measurement point in the reforming catalyst layer, it is preferred to use preferably a position where the temperature becomes relatively low in the reforming catalyst layer, more preferably a position where the temperature becomes the lowest in the reforming catalyst layer, as the position for the measurement of temperature, in terms of safe side control. When the reaction heat in the reforming catalyst layer is endothermic, the vicinity of the center of the catalyst layer may be selected as the temperature measurement position. When the reaction heat in the reforming catalyst layer is exothermic, and the temperatures of the end positions are lower than that of the center portion due to heat release, an end of the catalyst layer may be selected as the temperature measurement position. A location where the temperature becomes low may be found by preliminary experiment or simulation.

<Case where there are Plurality of Temperature Measurement Points>

The point for the measurement of temperature need not be one. Two or more temperature measurement points are preferred in terms of more accurate control. For example, it is possible to measure the inlet temperature and outlet temperature of the reforming catalyst layer and use their average temperature as the above-described reforming catalyst layer temperature T. However, in a case where the rate of a reaction other than a reaction accompanied by the decrease of the hydrocarbon-based fuel (raw fuel) supplied to the reforming catalyst layer is much faster than that of the reaction accompanied by the decrease of the raw fuel, and where it can be considered that components other than the raw fuel instantaneously reach an equilibrium composition, even if there are a plurality of temperature measurement points in the reforming catalyst layer, it is preferred to use the temperature of a point nearest to the outlet of the reforming catalyst layer, among the temperatures measured at the plurality of points, as the temperature used for calculating FkMinCALC in step C. When there are a plurality of temperatures of points nearest to the outlet of the reforming catalyst layer, a calculated value, such as the lowest value among them or their average value, may be appropriately used as a representative value.

Alternatively, for example, it is possible to consider regions Z obtained by dividing the reforming catalyst layer into N (N is an integer of 2 or more, and i is an integer of 1 or more and N or less), find the temperature $T_i$ of each divided region $Z_i$, and calculate FkCALC and FkMinCALC from each temperature $T_i$.

When N divided regions $Z_i$ are considered, FkCALC and FkMinCALC may be calculated for all divided regions, or a value(s) calculated for only one or some (not all) regions among the N divided regions may be used as FkCALC and FkMinCALC. The catalyst layer region(s) for the calculation may be appropriately changed according to the feed rate of the hydrocarbon-based fuel.

As the temperature of the divided region $Z_i$, actually measured temperature may be used as it is, but a calculated value, such as the average value of the inlet temperature and outlet temperature of the divided region, may be appropriately used as a representative value.

Also, it is not necessary to measure temperatures for all divided regions $Z_i$. Also, the number of divisions of the catalyst layer, N, and the number of temperature measurement point(s) may be independently set.

It is also possible to measure temperature(s) of one or some (not all) of the N divided regions and find temperature(s) of the remaining divided region(s) by appropriate interpolation from the measured temperature(s).

For example, as a temperature of a divided region where no temperature sensor is installed, a temperature of a divided region nearest to this divided region may be used. When there are two nearest divided regions, a temperature of either of the two divided regions may be used, or the average value of temperatures of the two divided regions may be used.

It is also possible to measure temperatures at a plurality of points in the reforming catalyst layer (at different positions along the gas flow direction), independently of the divided regions, and find a temperature of each divided region from the measured temperatures at the plurality of points. For example, it is possible to measure temperatures of the inlet and outlet of the reforming catalyst layer (a temperature of any position in the middle portion may be further measured), interpolate the temperature of the reforming catalyst layer from these measured temperatures by an approximation method, such as a least squares method, and find temperatures of the divided regions from the interpolation curve.

When reforming catalyst layer temperatures at a plurality of positions are measured in steps C1 and C7, the calculations of FkCALC and FkMinCALC may be performed using a temperature at the same position in each step. Alternatively, the calculations of FkCALC and FkMinCALC may be performed using temperatures at different positions.

(Examples of Positions for Measurement of Temperature)

In order to find temperatures of all divided regions, temperatures of the following positions may be measured.

The inlet and outlet of each divided region.

The interior (one point or a plurality of points) of each divided region (inner side of the inlet and the outlet).

The inlet, outlet, and interior (one point or a plurality of points for one divided region) of each divided region.

In order to find a temperature of one or some (not all) of the divided regions, temperatures of the following positions may be measured.

The inlet and outlet of one or some (not all) of the divided regions.

The interior (one point or a plurality of points) of one or some (not all) of the divided regions (inner side of the inlet and the outlet).

The inlet, outlet, and interior (one point or a plurality of points for one divided region) of one or some (not all) of the divided regions.

[Operation Conditions Other than Hydrocarbon-Based Fuel Flow Rate]

When the flow rate Fk of the hydrocarbon-based fuel is set to FkE, the flow rates of fluids supplied to the indirect internal reforming SOFC, such as the flow rate of water (including steam) for steam reforming or autothermal reforming and the flow rate of air for autothermal reforming or partial oxidation reforming, which are supplied to the reformer, the cathode air flow rate, the flow rates of the fuel and air supplied to the burner, and the flow rates of fluids, such as water and air, supplied to the heat exchanger; and the input and output of electricity to and from the indirect internal reforming SOFC, such as electrical heater output for heating the reformer, the water and liquid fuel evaporators, the cell stack, the fluid supply piping, and the like, and electrical input taken out from the thermoelectric conversion module and the like, can be accordingly set, as required, to the operation conditions in the reforming-stoppable state determined beforehand. In other words, the operation conditions of the indirect internal reforming SOFC can be set to the operation conditions of the indirect internal reforming SOFC in the reforming-stoppable state determined beforehand.

When Fk is set to a value other than FkE, for example, when the flow rate of the hydrocarbon-based fuel supplied to the reformer is changed in steps C4 and C8 and the step of setting Fk to FkM in step C9, and also when the reforming type is switched, the flow rates of fluids supplied to the indirect internal reforming SOFC, and the input and output of electricity to and from the indirect internal reforming SOFC may be accordingly set to operation conditions determined beforehand, as required, as in the above. For example, the flow rate of water supplied to the reformer may be set to a fixed value, such as the operation condition in the reforming-stoppable state determined beforehand, or in order to suppress carbon deposition, the water flow rate may be changed with the change of the fuel flow rate, so that a predetermined value of the steam/carbon ratio is maintained. With respect to the flow rate of air supplied to the reformer, the air flow rate may be changed with the change of the fuel flow rate, so that a predetermined value of the oxygen/carbon ratio is maintained. The flow rates of fluids supplied to the indirect internal reforming SOFC, other than the water and air supplied to the reformer, and the input and output of electricity to and from the indirect internal reforming SOFC may be set to fixed values, such as the operation conditions in the reforming-stoppable state determined beforehand, or may be set to operation conditions determined beforehand as functions of the fuel flow rate.

[Others]

When a steam reforming reaction is performed, that is, steam reforming or autothermal reforming is performed, steam is supplied to the reforming catalyst layer. When a partial oxidation reforming reaction is performed, that is, partial oxidation reforming or autothermal reforming is performed, an oxygen-containing gas is supplied to the reforming catalyst layer. As the oxygen-containing gas, a gas containing oxygen may be appropriately used, but in terms of the ease of availability, air is preferred.

The present invention is particularly effective when the hydrocarbon-based fuel has a carbon number of 2 or more, because in the case of such a fuel, particularly, reliable reforming is required.

In order to perform the method of the present invention, appropriate instrumentation and controlling equipment, including a computing means, such as a computer, may be used.

[Hydrocarbon-Based Fuel]

It is possible to use a hydrocarbon-based fuel appropriately selected from compounds of which molecules contain carbon and hydrogen (may also contain other elements, such as oxygen) or mixtures thereof that are known as raw materials of reformed gas in the field of SOFCs. It is possible to use compounds of which molecules contain carbon and hydrogen, such as hydrocarbons and alcohols. For example, hydrocarbon fuels, such as methane, ethane, propane, butane, natural gas, LPG (liquefied petroleum gas), city gas, gasoline, naphtha, kerosene and gas oil, alcohols, such as methanol and ethanol, ethers, such as dimethylether, and the like may be used.

Particularly, kerosene and LPG are preferred because they are readily available. In addition, they can be stored in a stand-alone manner, and therefore, they are useful in areas where the city gas pipeline is not built. Further, an SOFC power generating apparatus using kerosene or LPG is useful as an emergency power supply. Particularly, kerosene is preferred because it is easy to handle.

[Reformer]

The reformer produces a reformed gas containing hydrogen from a hydrocarbon-based fuel.

In the reformer, any of steam reforming, partial oxidation reforming and autothermal reforming in which a steam reforming reaction is accompanied by a partial oxidation reaction may be performed.

In the reformer, a steam reforming catalyst having steam reforming activity, a partial oxidation reforming catalyst having partial oxidation reforming activity, or an autothermal reforming catalyst having both partial oxidation reforming activity and steam reforming activity may be appropriately used.

With respect to the structure of the reformer, a structure known as that of a reformer may be appropriately used. For example, the structure of the reformer may be a structure having a region for housing a reforming catalyst in a vessel which can be closed to the atmosphere, and having an introduction port for fluids required for reforming and a discharge port for a reformed gas.

The material of the reformer may be appropriately selected for use from materials known as those of reformers, considering resistance in the environment used.

The shape of the reformer may be an appropriate shape, such as a rectangular parallelepiped shape or a circular tube shape.

A hydrocarbon-based fuel (vaporized beforehand as required) and steam, and further an oxygen-containing gas, such as air, as required, may be supplied to the reformer (the reforming catalyst layer), each independently, or appropriately mixed beforehand. The reformed gas is supplied to the anode of the SOFC.

[SOFC]

The reformed gas obtained from the reformer is supplied to the anode of the SOFC. On the other hand, an oxygen-containing gas, such as air, is supplied to the cathode of the SOFC. During electric power generation, the SOFC generates heat with electric power generation, and the heat is transferred from the SOFC to the reformer by radiation heat transfer and the like. In this manner, the exhaust heat of the SOFC is used to heat the reformer. Gas interfacing or the like is appropriately performed using piping and the like.

As the SOFC, a known SOFC may be appropriately selected for use. In the SOFC, generally, an oxygen-ion conductive ceramic or a proton-ion conductive ceramic is used as the electrolyte.

The SOFC may be a single cell, but practically, a stack in which a plurality of single cells are arrayed (the stack is sometimes referred to as a bundle in the case of a tubular type, and the stack in this specification includes a bundle) is preferably used. In this case, one stack or a plurality of stacks may be used.

The shape of the SOFC is also not limited to a cubic stack, and an appropriate shape may be used.

The oxidative degradation of the anode may occur, for example, at about 400° C.

[Enclosure]

The enclosure (module container) may be any appropriate container capable of housing the SOFC, the reformer, and the combustion region. An appropriate material having resistance to the environment used, for example, stainless steel, may be used as the material of the container. A connection port is appropriately provided for the container for gas interfacing or the like.

The module container is preferably hermetic in order to prevent communication between the interior of the module container and the surroundings (atmosphere).

[Combustion Region]

The combustion region is a region where an anode off-gas discharged from the anode of the SOFC can be combusted. For example, the anode outlet is opened in the enclosure, and a space near the anode outlet may be the combustion region. This combustion may be performed using, for example, a cathode off-gas, as an oxygen-containing gas. In order to do this, a cathode outlet may be opened in the enclosure.

In order to combust a combustion fuel or the anode off-gas, an ignition means, such as an igniter, may be appropriately used.

[Reforming Catalyst]

A known catalyst may be used for each of the steam reforming catalyst, the partial oxidation reforming catalyst and the autothermal reforming catalyst used in the reformer. Examples of the steam reforming catalyst include ruthenium-based and nickel-based catalysts. Examples of the partial oxidation reforming catalyst include a platinum-based catalyst. Examples of the autothermal reforming catalyst include a rhodium-based catalyst. When steam reforming is performed, an autothermal reforming catalyst having steam reforming function may be used.

A temperature at which the partial oxidation reforming reaction can proceed is, for example, 200° C. or more. A temperature at which the steam reforming reaction or the autothermal reforming reaction can proceed is, for example, 400° C. or more.

[Operation Conditions of Reformer]

The conditions during shutdown operation of the reformer for each of steam reforming, autothermal reforming, and partial oxidation reforming will be described below.

In steam reforming, steam is added to a reforming raw material, such as kerosene. The reaction temperature of the steam reforming may be in the range of, for example, 400° C. to 1000° C., preferably 500° C. to 850° C., and further preferably 550° C. to 800° C. An amount of the steam introduced into the reaction system is defined as a ratio of the number of moles of water molecules is to the number of moles of carbon atoms contained in the hydrocarbon-based fuel (steam/carbon ratio). This value is preferably 1 to 10, more preferably 1.5 to 7, and further preferably 2 to 5. When the hydrocarbon-based fuel is liquid, a space velocity (LHSV) can be represented as A/B, wherein a flow velocity of the hydrocarbon-based fuel in a liquid state is represented as A (L/h), and a volume of the catalyst layer is represented as B (L). This value is set in the range of preferably 0.05 to 20 $h^{-1}$, more preferably 0.1 to 10 $h^{-1}$, and further preferably 0.2 to 5 $h^{-1}$.

In autothermal reforming, in addition to the steam, an oxygen-containing gas is added to the reforming raw material. The oxygen-containing gas may be pure oxygen, but in terms of the ease of availability, air is preferred. It is possible to perform equilibrium calculation, and add the oxygen-containing gas so that an overall reaction heat is exothermic. With respect to the amount of the oxygen-containing gas added, a ratio of the number of moles of oxygen molecules to the number of moles of carbon atoms contained in the hydrocarbon-based fuel (oxygen/carbon ratio) is preferably 0.005 to 1, more preferably 0.01 to 0.75, and further preferably 0.02 to 0.6. A reaction temperature of the autothermal reforming reaction is set in the range of, for example, 400° C. to 1000° C., preferably 450° C. to 850° C., and further preferably 500° C. to 800° C. When the hydrocarbon-based fuel is liquid, the space velocity (LHSV) is selected from the range of preferably 0.05 to 20 $h^{-1}$, more preferably 0.1 to 10 $h^{-1}$, and further preferably 0.2 to 5 $h^{-1}$. With respect to an amount of the steam introduced into the reaction system, the steam/carbon ratio is preferably 1 to 10, more preferably 1.5 to 7, and further preferably 2 to 5.

In partial oxidation reforming, an oxygen-containing gas is added to the reforming raw material. The oxygen-containing gas may be pure oxygen, but in terms of the ease of availability, air is preferred. An amount of the oxygen-containing gas added is appropriately determined in terms of heat loss and the like to ensure a temperature at which the reaction proceeds. With respect to this amount, the ratio of the number of moles of oxygen molecules to the number of moles of carbon atoms contained in the hydrocarbon-based fuel (oxygen/carbon ratio) is preferably 0.1 to 3 and more preferably 0.2 to 0.7. A reaction temperature of the partial oxidation reaction may be set in the range of, for example, 450° C. to 1000° C., preferably 500° C. to 850° C., and further preferably 550° C. to 800° C. When the hydrocarbon-based fuel is liquid, the space velocity (LHSV) is selected from the range of preferably 0.1 to 30 $h^{-1}$. Steam can be introduced into the reaction system to suppress the generation of soot, and with respect to an amount of the steam, the steam/carbon ratio is preferably 0.1 to 5, more preferably 0.1 to 3, and further preferably 1 to 2.

[Other Equipment]

Known components of an indirect internal reforming SOFC may be appropriately provided as required. Specific examples of the known components include a vaporizer for vaporizing a liquid; a pressure increasing means for pressurizing various fluids, such as a pump, a compressor, and a blower; a flow rate controlling means or a flow path blocking/switching means for controlling the flow rate of a fluid, or blocking/switching the flow of a fluid, such as a valve; a heat exchanger for performing heat exchange and heat recovery; a condenser for condensing a gas; a heating/warming means for externally heating various devices with steam or the like; a storage means of a hydrocarbon-based fuel (reforming raw material) or a combustion fuel; an air or electrical system for instrumentation; a signal system for control; a control apparatus; and an electrical system for output and powering; a desulfurizer for reducing a sulfur concentration in a fuel; and the like.

INDUSTRIAL APPLICABILITY

The present invention can be applied to an indirect internal reforming SOFC used for, for example, a stationary or mobile power generating apparatus and a cogeneration system.

DESCRIPTION OF SYMBOLS 1 water vaporizer
2 electrical heater annexed to water vaporizer
3 reformer
4 reforming catalyst layer
5 combustion region
6 SOFC
7 igniter
8 enclosure (module container)
9 electrical heater annexed to reformer

The invention claimed is:

1. A shutdown method for shutting down an indirect internal reforming solid oxide fuel cell comprising
a reformer for reforming a hydrocarbon-based fuel to produce a reformed gas,
said reformer including a reforming catalyst layer,
a solid oxide fuel cell for generating electric power using the reformed gas,
a combustion region for combusting an anode off-gas discharged from the solid oxide fuel cell, and
an enclosure for housing the reformer, the solid oxide fuel cell, and the combustion region,
wherein
a flow rate of the hydrocarbon-based fuel supplied to the reformer in a state in which the following conditions i to iv are all satisfied is represented as FkE,
i) an anode temperature of the solid oxide fuel cell is steady,
ii) the anode temperature is less than an oxidative degradation temperature,
iii) in the reformer, the hydrocarbon-based fuel is reformed, and a reformed gas having a composition suitable to be supplied to an anode is produced, and
iv) an amount of the reformed gas produced is equal to or more than a requisite minimum flow rate FrMin for preventing oxidative degradation of the anode when the anode temperature of the solid oxide fuel cell is a temperature that is equal to or more than the oxidative degradation temperature,
a flow rate of the hydrocarbon-based fuel supplied to the reformer at a point of time of the start of the shutdown method is represented as Fk0,
a calculated value of a flow rate of the hydrocarbon-based fuel capable of being reformed at a measured temperature of the reforming catalyst layer by a reforming method is represented as FkCALC, a type of this reforming method being a type of a reforming method which is performed after the start of the shutdown method,
when the anode temperature falls below the oxidative degradation temperature, supply of the hydrocarbon-based fuel to the reformer is stopped to complete the shutdown method, and
while the anode temperature does not fall below the oxidative degradation temperature, the shutdown method comprises the following steps:
A) measuring a reforming catalyst layer temperature T, calculating FkCALC using this measured temperature T, and comparing values of this FkCALC and FkE;
B) when FkCALC<FkE in step A, performing the following steps B1 to B4 in order:
B1) increasing a temperature of the reforming catalyst layer,
B2) measuring the reforming catalyst layer temperature T, calculating FkCALC using this measured temperature T, and comparing values of this FkCALC and FkE,
B3) when FkCALC<FkE in step B2, returning to step B1, and
B4) when FkCALC≥FkE in step B2, adjusting the flow rate of the hydrocarbon-based fuel supplied to the reformer from Fk0 to FkE and moving on to step D;
C) when FkCALC≥FkE in step A, performing the following steps C1 to C5 in order:
C1) measuring the reforming catalyst layer temperature T, calculating FkCALC and FkMinCALC using this measured temperature T, said FkMinCALC being a flow rate of the hydrocarbon-based fuel at which the reformed gas at the flow rate FrMin can be produced in the reformer, and comparing values of this FkMinCALC and FkE,
C2) when FkMinCALC≥FkE in step C1, adjusting the flow rate of the hydrocarbon-based fuel supplied to the reformer to FkE and moving on to step D,
C3) when FkMinCALC<FkE in step C1, comparing values of FkMinCALC and FkCALC which have been calculated in step C1,
C4) when FkCALC>FkMinCALC in step C3, adjusting the flow rate of the hydrocarbon-based fuel supplied to the reformer to FkMinCALC and returning to step C1, and
C5) when FkCALC≥FkMinCALC in step C3, performing the following steps C6 to C9 in order:
C6) increasing the temperature of the reforming catalyst layer,
C7) measuring the reforming catalyst layer temperature T, calculating FkCALC and FkMinCALC using this measured temperature T, and comparing values of this FkCALC and FkE,
C8) when FkCALC<FkE in step C7, adjusting the flow rate of the hydrocarbon-based fuel supplied to the reformer to FkMinCALC and returning to step C6, and
C9) when FkCALC≥FkE in step C7, adjusting the flow rate of the hydrocarbon-based fuel supplied to the reformer to FkE and moving on to step D; and
D) waiting for the anode temperature to fall below the oxidative degradation temperature.

2. The method according to claim 1, wherein the hydrocarbon-based fuel comprises a hydrocarbon-based fuel having a carbon number of two or more.

3. The method according to claim 2, wherein a concentration of a compound having a carbon number of two or more in the reformed gas is 50 ppb or less on a mass basis.

* * * * *